UNITED STATES PATENT OFFICE.

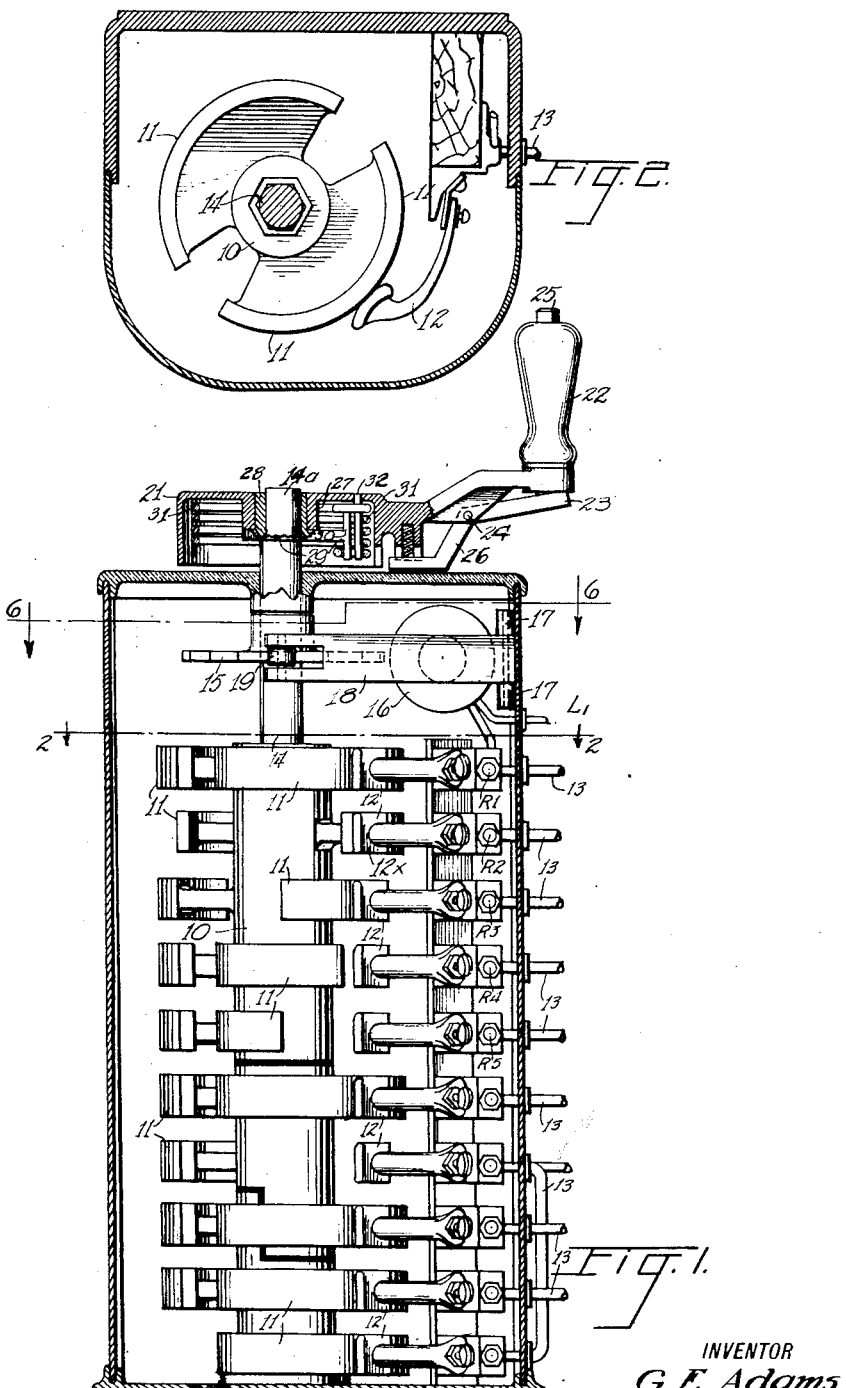

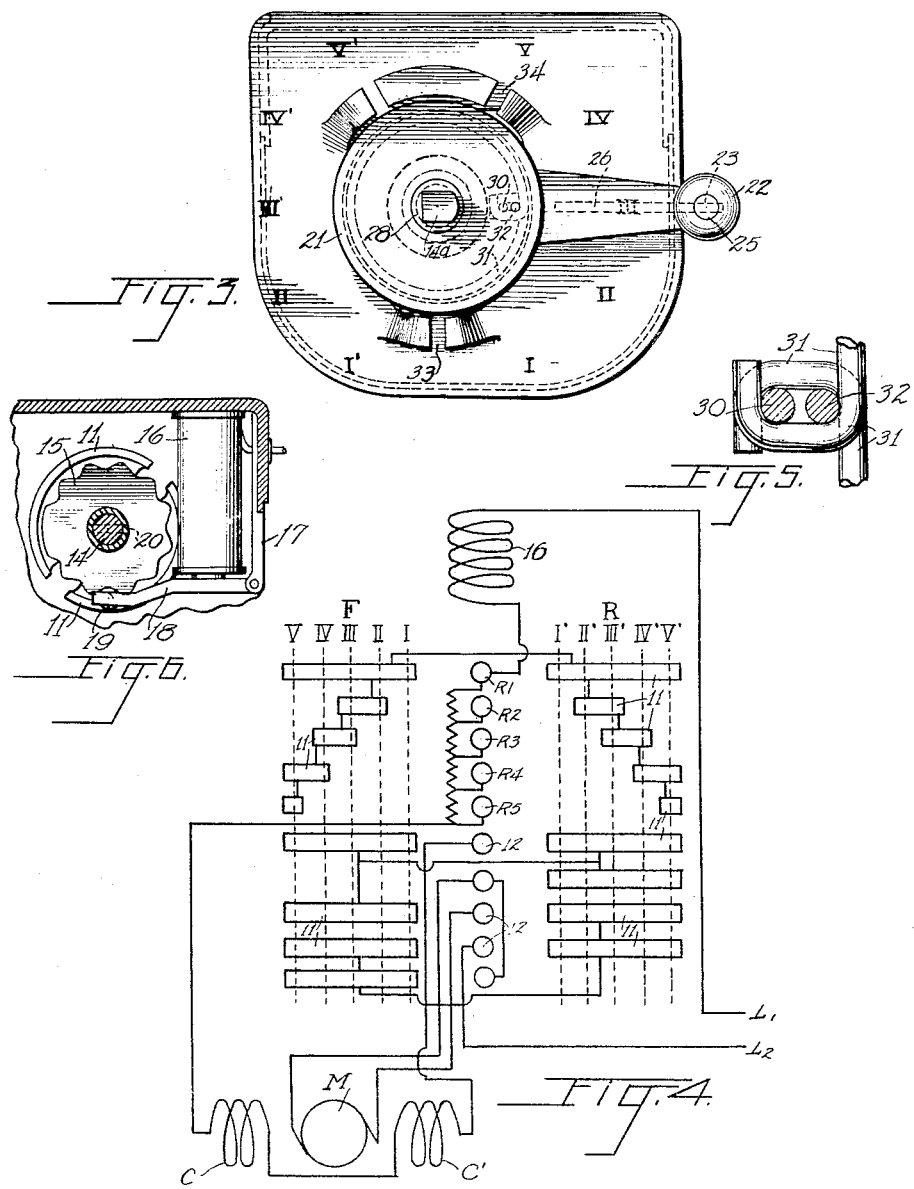

GILBERT E. ADAMS, OF GARY, INDIANA.

CONTROLLER FOR ELECTRIC MOTORS.

1,404,255.　　　　Specification of Letters Patent.　　Patented Jan. 24, 1922.

Application filed October 30, 1920. Serial No. 420,626.

*To all whom it may concern:*

Be it known that I, GILBERT E. ADAMS, a citizen of the United States, and a resident of Gary, in the county of Lake and State of Indiana, have invented a new and useful Improvement in Controllers for Electric Motors, of which the following is a full, clear, and exact description.

My invention relates to improvements in controllers for electric motors, and more particularly to manually operated controllers, used in starting direct current motors, and it consists in the combinations, constructions and arrangements, herein described and claimed.

All controllers for starting D. C. motors perform the following operations: first, to close the electrical circuit from the line through the motor and through a suitable resistance in series with it, and back to the other side of the line; second, to short out this resistance gradually as the motor comes up to speed until the full line voltage is impressed upon the motor; third, to open the electrical circuit when it is desired to stop the motor.

If the operator of the ordinary controller moves the controller handle around too fast, the resistance is shorted out before the motor attains the proper speed, and as a consequence, a large amount of current is allowed to pass through the motor, doing more or less damage to the motor and the machine which the motor is operating.

The main object of the present invention is to provide a device by means of which the starting resistance may be shorted out gradually as the motor comes up to speed, regardless of how fast the handle is thrown around.

A further object of the invention is to provide a controller in which the resistance is shorted out gradually, regardless of what load the motor is required to start with, or what the line voltage is.

A further object of the invention is to provide means for shorting out the resistance, which means may be readily applied to controllers of existing types, such as the drum type.

A further object of my invention is to provide a controller of the type described which is of relatively low cost and which takes up comparatively little space.

A further object of the invention is to provide a device of the type described which is relatively simple in construction and which will not easily get out of order.

Other objects and advantages will appear in the following specification, and the novel features of the invention will be particularly pointed out in the appended claims.

My invention is illustrated in the accompanying drawings, forming part of this application, in which—

Figure 1 is a central vertical section through the controller,

Figure 2 is a section along the line 2—2 of Figure 1,

Figure 3 is a top plan view,

Figure 4 is a diagrammatic view of the controller circuits,

Figure 5 is a fragmentary view of a portion of the device,

Figure 6 is a section along the line 6—6 of Figure 1.

In carrying out my invention, I make use of a drum of the ordinary type having a central rotatable body portion 10 and provided with conducting segments having contact shoes 12, each shoe being connected with a conductor 13. The body portion 10 is revoluble on a vertical axis, and the segments are arranged to be successively engaged by the shoes 12 as the drum is rotated. As will be seen from Figure 4 there are two sets of segments 11 on opposite sides of the contact shoes 12, these two sets of segments being for forward and reverse movements of the motor, whose movement is designed to be controlled by the device. In Figure 4 I have shown a typical motor-controlling circuit in which the armature of the motor is indicated diagrammatically at M, and the field coils at C and C' respectively. In Figure 4 it will be observed that I have indicated a coil 16, whose purpose will be explained later.

The body portion 10 of the drum is provided with a shaft or spindle 14 which extends upwardly, and which has a star wheel 15 mounted thereon. A magnetic coil 16 is positioned adjacent the star wheel 15 as shown in Figures 1 and 6. Hinged to a support 17 is an arm 18 which has a wheel 19 mounted in its free end, the wheel 19 being adapted to engage the notches in the star wheel 15. When the coil 16 becomes energized, the wheel 19 on the arm 18, engages one of the notches in the star wheel 15, thus preventing the movement of the star wheel in either direction. As will be noticed in Figure 6 the star wheel 15 is securely fastened to the shaft 14 by means of a pin 20.

Pivotally secured to the upper end of the shaft 14 is a cap or housing 21 to which is attached a handle 22, having a spring pressed locking lever 23, which is pivoted at 24, and which is provided with a push rod 25 extending through the handle, by means of which the lower portion 26 of the locking lever 23 may be raised when the push rod 25 is depressed. The cap or housing 21 has a sleeve 27, through the center of which, the upper part 14$^a$ of the shaft 14 projects. This upper part has flat faces, as shown in Figure 3, to receive a collar 28 of an arm 29, upon which the sleeve 27 is mounted for rotation. The arm 29 is provided with a laterally extending pin 30, the upper end of which is engaged by the upper end of a coil spring 31 which is looped around one side of the pin 30, as well as a pin 32 which projects downwardly from the cap 21. The lower end of the spring 31 is looped around in the opposite direction, as shown in detail in Figure 5, and is arranged to engage both the pins 30 and 32.

From the foregoing description of the various parts of the device, the operation thereof may be readily understood. As will be seen from Figure 3, there are the usual five stopping points, as indicated at 1, 2, 3, 4, and 5 for forward movement, and 1', 2', 3', 4', and 5' for reverse movement, the off position being indicated at 33. To start the motor, the push rod 25 is depressed, which frees the lever 26 from the slot 33, and the handle 22 is then turned immediately to the fifth position, the locking lever 26 entering the slot 34 at the fifth position. This completes a circuit from the line $L_1$, through the coil 16, all of the starting resistance, the motor field coils, the motor armature, and back to the other side of the line $L_2$. This current flowing through the coil 16 sets up a magnetic field. The magnetic attraction pulls the arm 18 so that the wheel 19 engages one of the notches of the star wheel 15, thereby preventing the further rotation of the drum. As the handle 22 continues to move, the pin 32 tends to move the lower end of the coil spring 31 around with it, the upper end being held by the pin 30 on the arm 29. Thus the spring is tightened and exerts a force on the arm 29, tending to move the drum in the direction in which the handle is rotated. As soon as the motor starts, the counter electromotive force generated in the motor causes the current to gradually diminish. When the current dies down to a certain amount, the star wheel 15 is exerting enough force, caused by the spring 31, to push the wheel 19 out from the notch it is in against the resistance of the now weakened magnet, whereupon the spring 31 will cause the drum to move around to the next notch, where the contact shoe 12$_x$ (see Figure 1) shorts out the first step of the resistance which is connected between $R_1$ and $R_2$. This causes another increase of current, and the arm 18 is pulled to the coil 16, thus holding the wheel 19 in the next notch of the star wheel 15 and preventing any further rotation thereof, until the motor has obtained sufficient speed to cause the current to die down to the required amount to release the arm.

The steps described above are automatically repeated until the drum gets around to the last point, where the arm 29, bearing the pin 30, lines up with the pin 32, bringing the end of the torsion spring 31 against both pins 30 and 32, and hence relieving the tension on the arm 29. The drum, consequently, stays in this position with all the starting resistance shorted out, until the handle is moved back to normal, i. e., to the notch 33. When the handle is moved backwardly, the drum moves with it and opens the motor circuit.

It will be seen that the rate of acceleration of the motor depends upon the amount of current only, which is limited to a fixed value, regardless of how fast the handle is thrown around, what load the motor is required to start, or what the line voltage is.

I claim:

1. A controller for motors having a starting resistance, comprising a frame having a series of stationary contacts in electrical connection with said resistance, a drum having a series of contacts arranged to engage said stationary contacts successively, a manually operated handle for causing an initial movement of said drum, said handle being free to move further, a spring arranged to be placed under tension by the movement of the handle for rotating said drum, and magnetically operated means for automatically alternately locking and releasing said drum to permit an intermittent movement thereof.

2. The combination with a controller for motors having a starting resistance, and comprising a movable drum having contacts adapted to be brought in electrical connection with the starting resistance, and a manually operated handle for causing an initial movement of said drum, said handle being free to move further, of a spring arranged to be placed under tension by the movement of said handle for rotating said movable member, a star wheel mounted on said drum, a magnetic coil in electrical connection with said motor, and an arm adapted to hold said star wheel, carried by said drum, from rotation when the coil becomes energized, whereby said drum is given an intermittent movement dependent on the rise and fall of the current passing through the motor, regardless of the rate of movement of the handle.

3. A controller for motors having a starting resistance comprising a frame having a series or stationary contacts in electrical connection with said resistance, a drum having a series of contacts arranged to engage said stationary contacts successively, a manually operated handle for causing initial movement of said drum, said handle being free to move further, a spring arranged to be placed under tension by the movement of the handle for rotating said drum, and magnetically operated means for automatically alternately locking said drum when said contacts are in engagement, whereby the movement of the drum is stopped and releasing said drum, to cause an intermittent movement of the drum.

GILBERT E. ADAMS.